United States Patent [19]

Sakagami

[11] Patent Number: 5,450,796

[45] Date of Patent: Sep. 19, 1995

[54] TRANSPORT SYSTEM WITH ELECTRIC RAIL CARS

[75] Inventor: Tatsuya Sakagami, Kobe, Japan

[73] Assignee: Daifuku Co., Ltd., Osaka, Japan

[21] Appl. No.: 184,979

[22] Filed: Jan. 20, 1994

[30] Foreign Application Priority Data

Oct. 20, 1993 [JP] Japan .................. 5-262019

[51] Int. Cl.$^6$ ............................... B61B 3/00
[52] U.S. Cl. ......................... 104/89; 104/249; 104/251; 104/252; 104/288; 105/148
[58] Field of Search ............... 104/249, 250, 251, 252, 104/89, 93, 172.2, 172.3, 172.4, 288; 105/148, 150

[56] References Cited

U.S. PATENT DOCUMENTS

| | | | |
|---|---|---|---|
| 3,477,390 | 11/1969 | Doling | 104/251 |
| 3,861,323 | 1/1975 | Turner | 104/250 |
| 3,948,187 | 4/1976 | Moore | 104/250 |
| 4,147,110 | 4/1979 | Knudsen | 104/250 |
| 4,294,174 | 10/1981 | Todt | 104/249 |
| 4,735,042 | 4/1988 | Igel | 104/249 |
| 5,060,789 | 10/1991 | Nelson | 104/249 |
| 5,083,656 | 1/1992 | Nelson | 104/249 |
| 5,211,115 | 5/1993 | Maier et al. | 104/249 |

FOREIGN PATENT DOCUMENTS 1648861  5/1991  U.S.S.R. .................. 104/249

*Primary Examiner*—Mark T. Le
*Attorney, Agent, or Firm*—Schweitzer Cornman & Gross

[57] ABSTRACT

A transport system having a first electric rail car adapted to be propelled over a guide rail, a rail car stopping device being disposed separately from the first rail car along the guide rail, the first rail car having a brakeless motor, an electric power supply circuit for the motor, a wheel driven from the electric motor, a first limit switch, a second limit switch, the first and second limit switches being in the electric power supply circuit for selectively cutting off the supply of electricity to the motor, a stop engaging member, and stopping control device for a second electric rail car following the first electric rail car, the stopping control device having an elongated member projecting rearwardly from the first electric rail car for opening a second limit switch of the second electric rail car when the second electric rail car approaches the first electric rail car closer than a predetermined distance to prevent a collision between the first and second electric rail cars, the stopping control device having a flat control face portion for controlling an electrical limit switch of the second electric rail car so that the second rail car continues to move by its momentum after electric power to its motor was cut off when the second limit switch was opened by contact with the stopping control device.

4 Claims, 3 Drawing Sheets

TRANSPORT SYSTEM WITH ELECTRIC RAIL CARS

FIELD OF THE INVENTION

The present invention relates to a transport system for transferring workpieces along a predetermined route such as in factories, and particularly to a transport system which comprises electric conveying rail cars that are serf propelled along a guide rail by an electric motor, and a rail car stopping device along the tracks.

BACKGROUND OF THE INVENTION

In a conventional transport system of the above type, the driven wheel of the electric conveying rail cars is customarily rotated by a modified electric motor for driving the rail .car, having a built-in electromechanical brake. In these prior art devices the electric conveying rail car has a high production cost and a complicated way of releasing and applying the built-in electromechanical brake of the electric motor when it is desired to move the electric rail car manually or by an external supplementary conveyor in a special rail section. That is, the stopping and starting of the electric rail car involves a considerable input of labor.

BRIEF DESCRIPTION OF THE INVENTION

For the purpose of overcoming the drawbacks of the prior art, it is a primary object of the present invention to provide a transport system in which electric conveying rail cars can be driven by a conventional, inexpensive brakeless electric motor which does not require complex brake releasing apparatus and procedures even when the electric rail car is set free.

It is another object of the present invention to provide a transport system in which the electric conveying rail cars self-propelled by a conventional brakeless electric motor, can be stopped and made to stand easily at any desired positions under suitable control.

With the above objects in view, the present invention provides a transport system with electric conveying rail cars self-propelled on a guide rail with a rail car stopping device is placed on the tracks. The electric conveying rail car has a driven wheel, a conventional type of brakeless motor for rotating the driven wheel and a first switch and second switches provided in a power supply circuit connected to the brakeless motor. These switches are open when the supply of power to the brakeless motor is off. The rail car also has a stop engagement member, and means for stopping a following rail car in the form of an elongated member projecting from behind the rail car and adapted to actuate by opening the second switch of the following electric rail car thereby to avoid a collision of two electric rail cars, one behind the other. The stop control means of the rail car has a fiat switch control face of a predetermined length along the longitudinal axis of the rail car, allowing an inertial movement of the following rail car with its second switch kept open. The rail car stopping device has a stopper for blocking the stop engagement member of the rail car to control switch control means for opening the first switch before the stop engagement member of the rail car abuts against the stopper, and position changing means for shifting the stopper and the switch control means from an inactive, withdrawn position to an active position. The switch control means has a control flat switch control face of a predetermined length along the longitudinal axis of the rail car to allow an inertial movement of the rail car with the first switch being held open.

In contrast with the prior an which employs a modified electric motor with a built-in electromechanical brake that is applied automatically when the supply of electricity is cut off to the motor, a conventional brakeless electric motor is used in the transport system of the present invention, for rotating the drive wheel of an electric conveying rail car. Therefore, it is possible according to the present invention to reduce production costs, especially of the electric motor. Furthermore, when the electric car has to be moved manually or by an auxiliary moves, such as for inspection and maintenance, that can be simply carried out by simply cutting off the power to the motor, without special devices and any complex operations involving releasing the brake. Therefore, the required activity can be carried out easily and at a lower cost.

The electric conveying rail car of the present invention can be reliably and automatically stopped in a predetermined position by the rail car stopping device on the tracks cooperating with the first switch and the stop engagement member of the rail car. The following conveying rail car can also be halted and caused to stand by automatically with the result that the second switch of the following rail car cooperates with the stopping control means of the stopped preceding rail car.

In this cooperation with the rail car stopping device, the first switch of the rail car to be stopped is opened by the switch control means of the rail car stopping device and thus the supply of power to the motor is cut off. The rail car continues to move by inertia and then stops by itself or can be forced to stop by contact of the stop engagement member of the rail car with the stopper of the rail car stopping device. The first switch is kept open by the flat switch control face on the switch control means.

In the described cooperation with the stopped preceding rail car, the second switch of the following rail car is opened by this stopping control means for a following rail car, of the preceding rail car. As power to the motor is cut off, the following rail car moves by inertia and then halts by itself, or is brought to a halt by contact with the rear end of the stopped preceding rail car. In this manner, the second switch can be kept open by the flat switch control face of the succeeding rail car control means.

DESCRIPTION OF THE DRAWING

The present invention is described in detail with reference to the accompanying drawings, in which.

DETAILED DESCRIPTION

Figure 1:
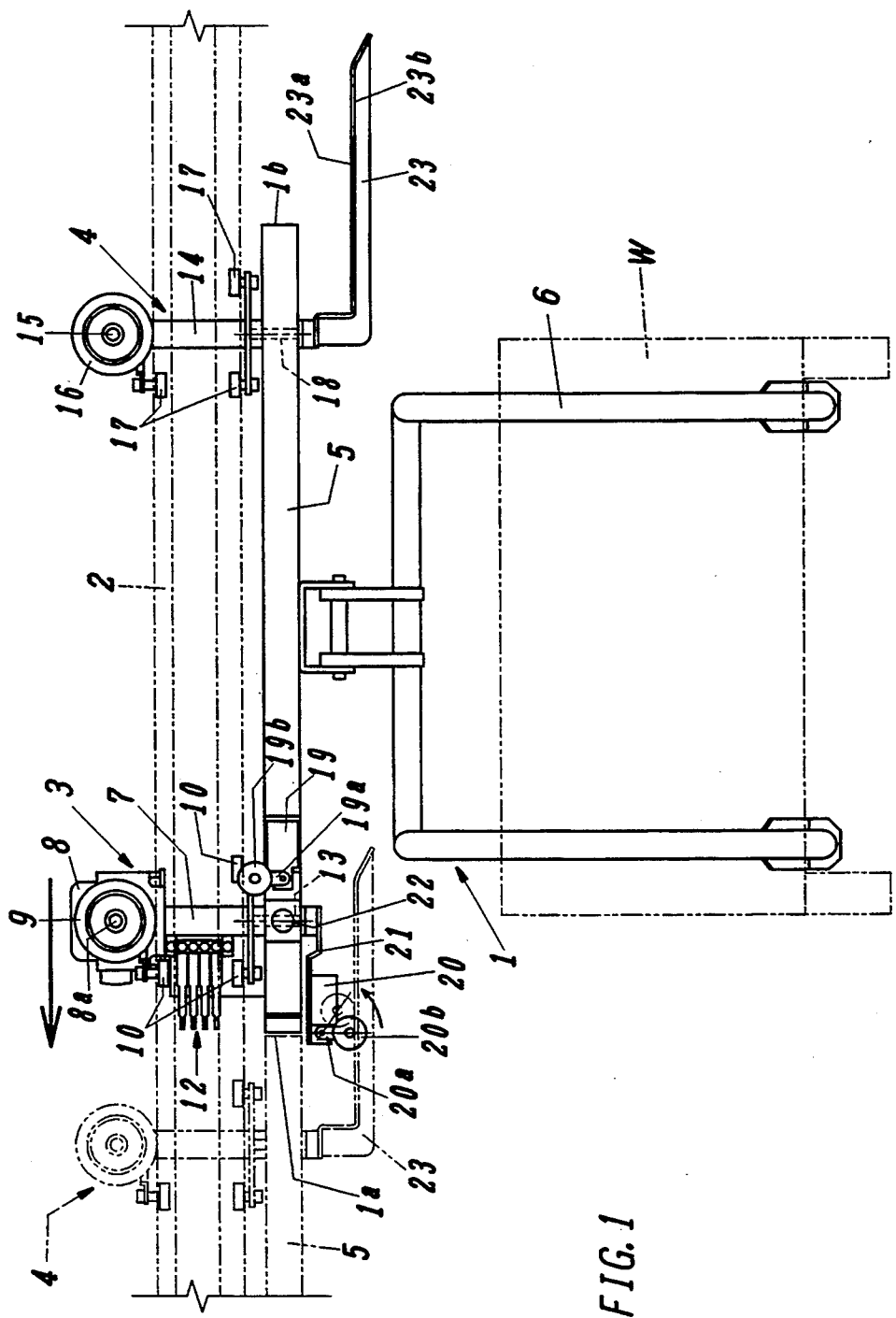
FIG. 1 is a side elevational view of a transport system of the present invention with a guide rail shown supporting an electric rail car.

An electric conveying rail car 1, conveying articles like workpieces, is suspended from and self-propelled along a guide rail 2. A driven trolley assembly 3 is located at the front and a follower trolley assembly 4 at the rear of the rail car. These trolley assemblies are coupled to each other by an underlying load support bar from which a hanger 6 is suspended for holding articles "W" to be conveyed.

Figure 2:
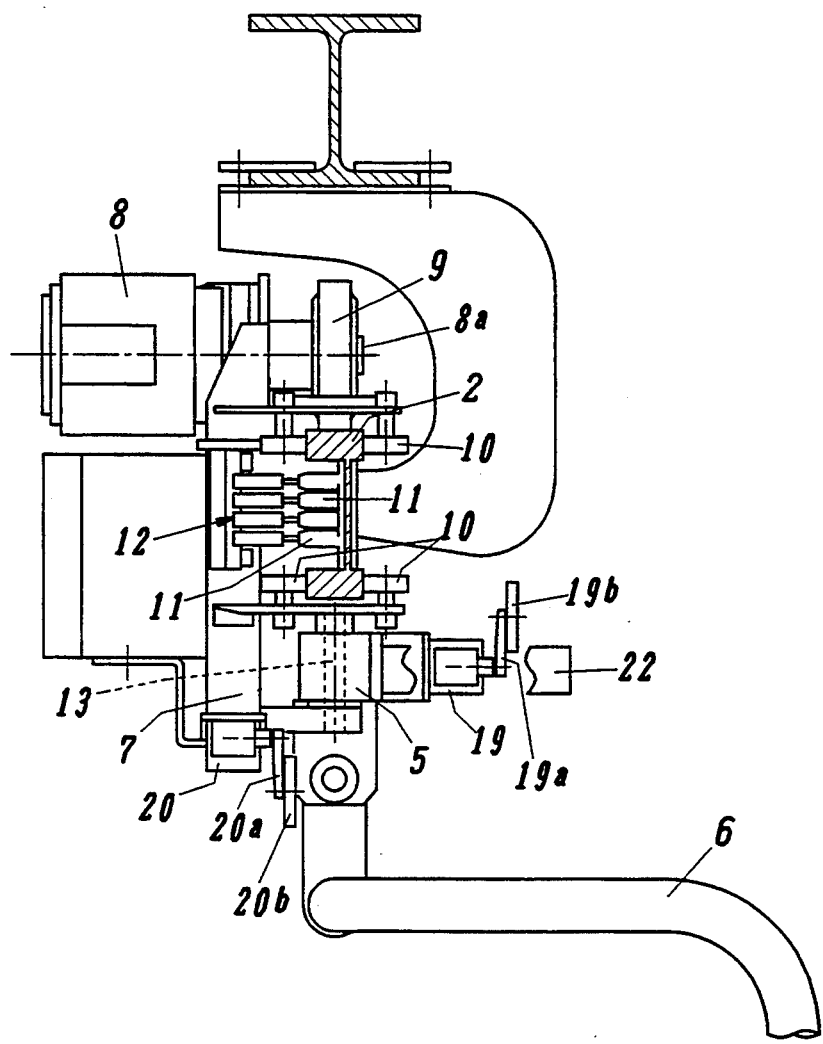
FIG. 2 is a front elevational view showing the main portions of an electric rail car.

The driven trolley assembly 3 has a trolley frame 7 arranged beside the guide rail 2, a conventional type of brakeless electric motor 8 which has an integral decelerator, and is mounted on the upper portion of the trolley frame 7. A driven, wheel 9 of the driven trolley assembly 3 is joined to an output shaft 8a of the motor 8, and is arranged to roll on the top face of the guide rail 2. Pairs of sway protection rollers 10 are pivoted from the trolley frame 7 by a vertical shaft and are arranged to catch the upper and lower portions of the guide rail 2 from its right and left sides. A current collector 12 slides on a current feeder 11 laid along one side of the guide rail 2 (see FIG. 2). The front portion of the load support bar 5 is pivotably joined to the lower portion of the trolley frame 7 by a vertical shaft 13.

The follower trolley assembly 4 has a trolley frame 14 arranged beside the guide rail 2, an idle wheel 16 having a horizontal shaft 15 within a bearing, is mounted on the upper portion of the trolley frame 14 and arranged to roll on the top face of the guide rail 2. Pairs of sway protection rollers 17 are pivoted from the trolley frame 14 by a vertical shaft and are arranged to catch the upper and lower portions of the guide rail 2 from its right and left sides. The rear portion of the load support bar 5 is pivotably joined to the lower portion of the trolley frame 14 by a vertical shaft 18.

A first limit switch 19, and a second limit switch 20 are respectively provided in a current supply circuit connected to the motor 8, for stopping the functioning of the motor by breaking the circuit. The first limit switch 19 is associated with a rail car stopping device 24 mounted on a side of the load support bar 5 directly behind the driven trolley assembly 3, and is provided with an actuator lever 19a which is usually disposed in an upright position and has a large diameter follower roller 19b pivoted on the free top end of the lever 19a. The second limit switch 20 is mounted on the lower side of the front end of a bracket 21 and is adapted to cooperate with a stopping control means 23 of a preceding electric rail car. The rear end of the bracket 21 is attached to the bottom of the trolley frame 7 of the driven trolley assembly 3 while the other front end extends longitudinally. In addition, the second limit switch 20 is provided with an actuator lever 20a usually disposed perpendicularly downward. The actuator lever 20a has a large diameter of a follower roller 20b pivoted on the free bottom end thereof. When the actuator levers 19a, 20a are forced to tilt backwards, both the limit switches 19, 20 are opened and interrupt the current supply circuit to stop the electric rail car 1.

The rail car has a stop engaging member 22 and a stopping control means 23 for a following rail ear is adapted to actuate a second limit switch 20 of a following electric rail car. The stop engagement member 22 on the rail ear is shaped like a pole, one end of which is fixed on the side of the load support bar 5 at a position right before the first limit switch 19. The other end of the stop engagement member 22 extends horizontally along the load support bar 5. The stopping control means 23 for the following rail car extends rearwardly from the trolley frame 14 of the follower trolley assembly 4 at the rear, and has an elongated abutment plate 23b and a switch flat control face portion 23a defined on the top of the abutment plate 23b extending to some length rearwardly of the running direction of the rail car. When the front of the following electric car (i.e., the front end 1a of the load support bar 5 thereof) collides with the rear of the preceding electric rail car (i.e., the rear end 1b of the load support bar 5 thereof) the switch flat control face portion 23a of the preceding rail car actuates the second limit switch 20 of the following rail car 1 to break its current supply circuit and at the same time allows the following rail car to run only by its momentum so that the second limit switch is kept opened due to the continuing actuated contact.

Figure 3:
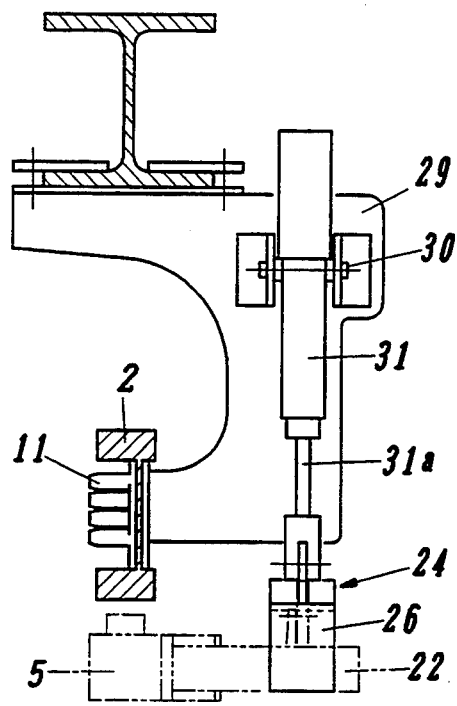
FIG. 3 is a front elevational view of a rail car stopping device on the tracks.
Figure 4:
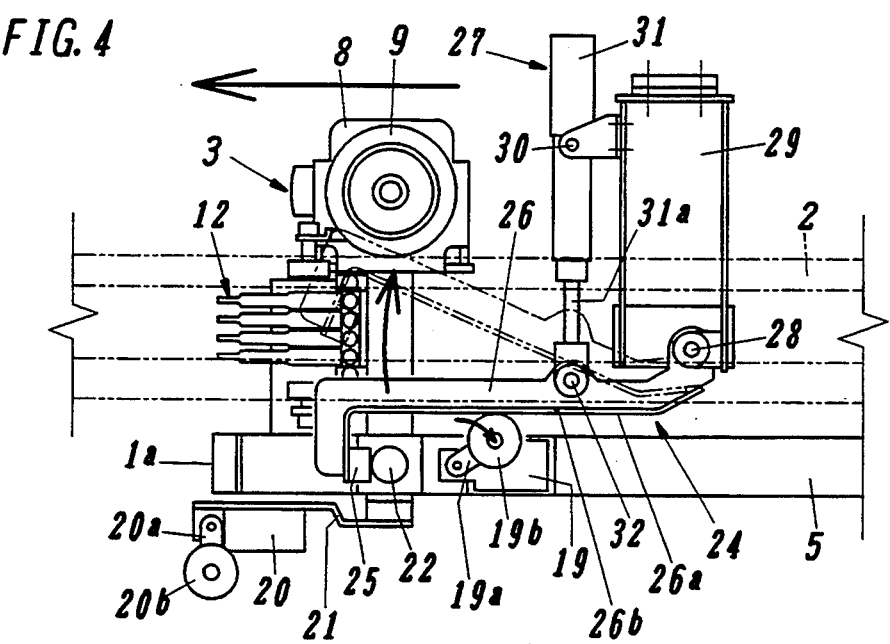
FIG. 4 is a side elevational view showing main portions of each of the rail car stopping device and the electric rail car.

As shown in FIGS. 3 and 4, a rail car stopping device 24 is placed along the tracks at a desired halting position of the electric rail car 1. The rail car stopping device 24 has a stationary stopper 25 along the tracks for blocking the stop engaging member 22 on the rail car, a switch control means 26 for operating the first switch 19, and a position changing means 27 for positioning the stationary stopper 25 and the switch control lever 26 either at a switch actuating horizontal position, as shown by a solid line in FIG. 4, or at a non-actuating, upward tilted position, as shown by a broken line in FIG. 4. More particularly, the switch control lever 26 includes an elongated abutment plate 26b and a flat switch controlling face portion 26a defined on the bottom of the abutment plate 26b through a preselected length paralleling the direction of travel of the rail car. The stopper 25 faces rearwardly towards a downwardly bent portion of the front end of the elongated abutment plate 26b. A position changing means 27 includes a cylinder 31 supported in a vertical position by a horizontal shaft 30 from a fixed back frame-box 29. The rear end of the switch control lever 26 is pivoted from the bottom of the back frame-box 29 in a vertically swingable manner, by a horizontal shaft 28. The fulcrum of the switch control lever is pivoted about a horizontal shaft 32 on the lower end of a downward projecting piston rod 31a of the cylinder 31. When the flat switch controlling face portion 26a of the switch control lever 26 of a rail car stopping device 24 is shifted downwardly to the horizontal position shown by the solid line in FIG. 4, to its switch actuating position, it actuates or opens the first limit switch 19 of a rail car and at the same time allows the momentum of the rail car to continue moving it forward until the stopper 25 of the stopping device 24 engages the stop engaging member 22 of the rail car while it continues to keep the first switch 19 open.

In the transport system described above, the electric conveyor rail car 1 is driven along the guide rail 2 by the driven wheel 9 rotated by the motor 8. The motor is energized by the electric current supplied to the current collector 12 of the electric rail car 1 from the current feeder 11 on the guide rail 2. In this manner, when the electric rail car 1 arrives at the rail car stopping device 24, at the predetermined halting position, the follower roller 19b of the first switch 19 of the electric rail car 1 is depressed by the flat, switch controlling face portion 26a on the bottom of the switch control lever 26 in its horizontal, active position, as shown by a solid line in FIG. 4. The switch actuator lever 19a is tilted rearwardly and opens the first limit switch 19 interrupting the current supply to the motor 8. The electric rail car 1 continues to advance under its momentum until the electric rail car is brought to a halt by the contact of its stop engaging member 22 with the fixed, stationary stopper 25 shifted to its stopping position. The follower roller 19b and the actuator lever 19a of the first limit switch 19 are kept depressed by the flat, switch controlling face portion 26a of the switch control lever 26 so that the current supply to the motor 8 remains cut off.

The flat, switch controlling face portion 26a of the switch control means 26 extends so that after the switch control lever 26 of a rail car stopping device 24 opens the first limit switch 19 of a rail car to break the current supply to the motor, the rail car is allowed to travel a short distance inertially without a sudden halt until the rail car is stopped by the trackside stopper 25 blocking the stop engaging member 22. The flat switch controlling face portion 26a can be extended further to such an extend that after the opening of the first limit switch 19 stops the motor and the rail car continues to run by its own momentum, it will stop due to frictional resistance before arresting contact is made between the stop engaging member 22 and the stopper 25.

Where a following rail car 1 approaches a preceding rail car 1 which is halted by the rail car stopping device 24, the follower roller 20b of the second limit switch 20 of the following rail car 1 is opened as shown on the left side of FIG. 1, in broken lines, by stopping control means 23 of the stopped preceding rail car 1, while the actuator lever 20a supporting the roller 20b is forced to tilt rearward to actuate the second limit switch 20. Hence, an interruption takes place in the current supply to the motor 8 of the following rail car 1, so that the motor 8 is set to run freely. The following rail car 1 advances inertially to a slight extent until the following rail car 1 is brought to a halt by the contact with the front of the following rail car (i.e., the front end 1a of the load support bar 5), as shown in broken lines in FIG. 1, with the rear (i.e., the rear end 1b of the load support bar 5) of the preceding rail car 1. In addition, the roller 20b and the actuator lever 20a of the second limit switch 20 keeps riding on the flat control face portion 23a of the stopping control means 23 for the following rail car extending in the running direction of the rail car, so that the motor current supply circuit remains open.

In other words, flat control face portion 23a of the stopping control means 23 for the following rail car is extended in the running direction of the rail car, so that after the stopping device 24 of the preceding car opens the second limit switch 20 of the following rail car to open the motor current supply circuit, the following rail car continues to travel to a slight extent by its momentum with the second limit switch open without a sudden halt, until the front end 1a of the following rail car is blocked by the rear end 1b of the stopped preceding rail car. If desired, the flat control face portion 23a of the stopping control means 23 for the following rail car can be extended further to an extent that the following rail car, running under its momentum after the opening of the second limit switch 20, halts due to a sliding resistance before the front end 1a of the following rail car is blocked by the rear end 1b of the stopped preceding rail car.

In a similar manner, a plurality of the following electric rail cars, which follow the preceding electric rail car stopped at the desired halting position by the rail car stopping device 24, can be forced to halt and stand by in succession automatically. When the electric rail car at the head of a series of the stopped rail cars is required to be restarted again, the switch control lever 26 with the stationary stopper 25 of the rail car stopping device 24 is raised with the cylinder 31 upwardly around the horizontal shaft 28 so as to be shifted to the inactive withdrawal position as shown by the broken line. As a result, the actuator lever 19a of the open first limit switch 19 turns upwardly and returns to the upright position, while the motor current supply circuit of the stopped preceding rail car is closed to energize the motor 8, so that the eventual rotation of the driving wheel 9 drives the preceding rail car forwards.

With the forward running of the restarted preceding rail car, its stopping control means 23 for the following rail car moves forward and away from the open second limit switch 20 of the stopped following rail car. As a result, the actuator lever 20a of the open second limit switch 20 turns downwardly and returns to its original position, while the motor current supply circuit of the stopped following rail car is re-closed to re-energize the motor 8, so that the eventual rotation of the driving wheel 9 drives the preceding rail car forward. However, when the following rail car 1 is required to stop again at the halting position, the switch control lever 26 with the stationary stopper 25 of the rail car stopping device 24 can be shifted to the active position, as shown in solid line in FIG. 4, with the cylinder 31.

In special railway sections which are arranged in distinct working zones, or in a slanting fashion, the current feeders 11 are not mounted on the guide, so that to set the electric rail car free the current is not supplied to the motor 8 of the electric rail car 20. As the electric rail car is set free in the special rail section and is moved steadily forwardly by an external supplementary conveyor (not shown). More particularly, the steady movement of the rail car is assured by engaging the stop engagement member 22 of the rail car with a pusher which is provided in the supplementary conveyor apparatus. Besides, in cases where the electric rail cars are set free for the purpose of checking and maintenance by cutting off the power supply to the current feeder 11, each of the electric rail cars 1 can be easily moved by an expedient such as manually, because the motor 8 is free to turn and the electric rail car 1 is ready to move freely without questions.

In the above-described embodiment of the present invention, the limit switches are of a contact type, which are actuated by the contact with the switch control lever 26, of the stopping device 24 or the stopping control means 23 of the succeeding rail car, as the first and second switches 19, 20 in the motor current supply circuit. However, switches or sensors of an electromagnetic or photo-electric non-contact type can also be used. In the latter case, the switch control means 26 and the succeeding rail car control means 23 are required to have a structure suitable for the switches or sensors to be used.

I claim:

1. A transport system which comprises a first electric rail car for travel over a guide rail, a rail car stopping device being disposed separately from the first rail car along said guide rail for selectively stopping said first electric rail car, the first rail car having a brakeless motor for driving said rail car over the guide rail, an electric power supply circuit for said motor, a wheel driven from said electric motor, a switch, a limit switch, said switch and limit switch being in said electric power supply circuit for selectively cutting off the supply of electricity to said motor, a stop engaging member for stopping said rail car in cooperation with said stopping device, and stopping control means for a second electric rail car following said first electric rail car, said stopping control means having an elongated member projecting rearwardly from said first electric rail car for opening a limit switch of said second electric rail car when said second electric rail car approaches said first electric rail car closer than a predetermined distance to prevent a collision between said first and second electric rail cars, said stopping control means having a fiat control face portion for controlling said limit switch of said second electric rail car so that said second rail car continues to move by its momentum after electric power to its motor was cut off when said limit switch was opened by contact with said stopping control means.

2. The transport system of claim 1, wherein the rail car stopping device comprises a stationary stopper for selectively contacting said stop engaging member, switch control means adjustable between an active position and an inactive position, and position changing means for reversibly shifting said switch control means from said inactive position in which said switch control means does not contact said switch of said first car to said active position in which said switch control means contacts said switch of said first car, said switch control means having a fiat, switch controlling face portion, said switch control means being adapted to open said switch before said stationary stopper contacts said stop engaging member to allow said first electric rail car to continue forward movement under its momentum while said switch of said first electric rail car is kept open.

3. The transport system of claim 2 wherein said second rail car further includes a switch, said switch and said limit switch of said second rail car each including an actuator means and a roller disposed at one end of said actuator means, said fiat control face portion of said stopping control means in said first electric rail car is adapted to contact a respective roller in said second electric rail car and to tilt rearwardly the actuator means associated with such contacted roller in said second electric rail car for opening a said limit switch in said second rail car.

4. The transport system of claim 2 wherein said position changing means has a pneumatic cylinder unit for shifting said switch control means.

* * * * *